Sept. 15, 1953     A. LAGARDÈRE     2,652,046
POWER INDICATING APPARATUS FOR INTERNAL-COMBUSTION
ENGINES OR MOTORS PROVIDED WITH GOVERNOR
Filed Jan. 31, 1949     2 Sheets-Sheet 1

INVENTOR:
ALBERTO LAGARDÈRE

By E. F. Wenderoth
ATTORNEY

Sept. 15, 1953 A. LAGARDÈRE 2,652,046
POWER INDICATING APPARATUS FOR INTERNAL-COMBUSTION
ENGINES OR MOTORS PROVIDED WITH GOVERNOR
Filed Jan. 31, 1949 2 Sheets—Sheet 2

INVENTOR:

ALBERTO LAGARDÈRE

By E. F. Wendroth
ATTORNEY

Patented Sept. 15, 1953

2,652,046

UNITED STATES PATENT OFFICE 2,652,046

POWER INDICATING APPARATUS FOR INTERNAL COMBUSTION ENGINES OR MOTORS PROVIDED WITH GOVERNOR

Alberto Lagardère, Barcelona, Spain, assignor to Juan Baurier Tivollier, Barcelona, Spain Application January 31, 1949, Serial No. 73,855
In Spain November 8, 1948

4 Claims. (Cl. 123—198)

My invention relates to apparatus for indicating the power of internal combustion engines the feed of which is regulated by means of a governor.

In order to indicate or test the power of these internal combustion engines, provided with governor, a rod through the medium of which the governor of the engine controls the working of the pumps or fuel-supply members is associated with a needle or pointer which can move over a dial, and which indicates at any moment the position of the members which regulate the working of the pump or other fuel-supply apparatus, and consequently indicates the load at which the engine is working.

The object of the present invention is to provide apparatus which will be specially suitable for indicating the load on the engine in agreement with this general system.

This apparatus is mounted in a fixed position on the engine, and comprises a dial the needle of which is actuated by a piston or sliding pin, which in its turn is actuated by an abutment fixed to the rod by which the governor controls the working of the fuel-supply pump.

The apparatus which is the subject of this invention permits an exact adaptation to the various engines, and for this purpose it comprises means for regulating the movement-transmitting mechanism between the rod of the governor and the needle.

The apparatus which is the subject of the invention is shown in the accompanying drawings, in which.

Figure 1:
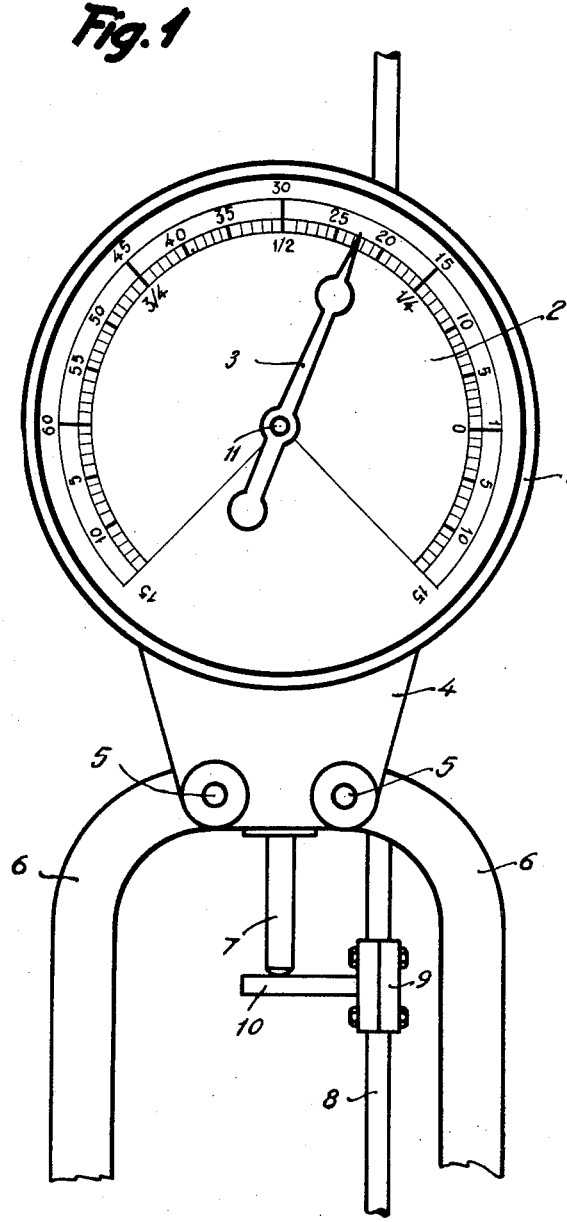
Figure 1 is an outside view of the apparatus.
Figure 2:
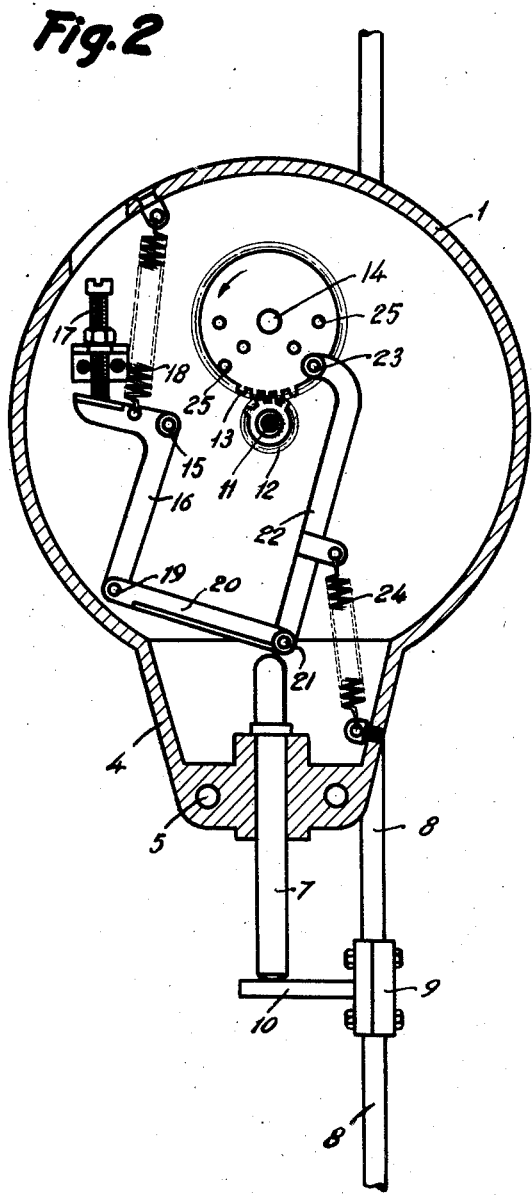
Figure 2 is a section showing its internal mechanism, after the dial and the needle or pointer have been removed.

The apparatus comprises a casing 1, the front part of which is formed by a dial 2, over which moves a needle or pointer 3. The casing has at the lower part an extension 4, provided with holes 5, which enable it to be fixed by means of screws or bolts to any suitable support 6 on the engine. In this lower part is arranged a plunger or longitudinally sliding pin 7, which serves to actuate the apparatus and for this purpose the apparatus is mounted in the vicinity of the rod 8, which transmits the movements of the governor in the injection pump or other fuel-supply apparatus. On this rod 8 is arranged some member which, on the movement of the rod, will actuate the plunger 7, for example there is fixed to the rod a bracket 9, with an arm 10, which is situated immediately beneath the end of the plunger 7.

Consequently, when the rod 8 rises in order to increase the admission of fuel into the engine, the arm 10 raises the plunger 7 and causes the needle or pointer 3 to rotate in a suitable direction of the dial 2, thus showing at any moment the rate of admission of fuel determined by the governor of the engine, and hence the load on this engine. When the rod 8 descends in order to reduce the admission of fuel, the load having diminished, a spring 24 arranged inside the apparatus actuates the members of the apparatus, including the plunger 7, in the opposite direction.

The shaft 11 of the needle 3 is provided inside the casing of the apparatus with a toothed pinion 12, which constantly engages with a toothed wheel or sector 13 of greater diameter, which can rotate on a shaft or spindle 14. In order to transmit the movement of the plunger 7 to the wheel 13, which transmits it in turn to the needle 3, the mechanism which is described in the following paragraph is used.

Upon a stationary pivot 15 in the casing of the apparatus is mounted a bell-crank lever 16, the upper arm of which bears constantly against a regulating screw 17 through the action of a spring 18. To the lower end of this bell-crank lever 16 is connected by a pivotal pin 19 another lever 20, which bears, at or near its free end, on the upper end of the plunger 7. This lever 20 has articulated to it at 21 a link 22, the upper end of which is articulated to a pin 23 fixed to the toothed wheel 13, in such a way that when the plunger 7 rises, it raises the lever 20, which raises the link 22, which moves the toothed wheel 13, making it turn in the direction of the arrow through a greater or smaller angle corresponding to the movement of the plunger 7. The link 22 is also actuated by the spring 24, which ensures that at every moment the end of the lever 20 will bear against the plunger 7, and this latter in its turn will bear against the arm 10 of the rod 8 of the governor, so that the position of the needle or pointer 3 on the dial of the apparatus will always be proportional to the position of the rod 8 of the governor, and hence to the admission of fuel determined by the governor in relation with the load on the engine.

In order to enable this apparatus to be adapted to different types of engines, it is possible to arrange from the outset, on the toothed wheel 13, various holes 25 situated in different positions and at different distances from the axis 14, into any one of which it is possible to fit the pin 23 as desired, so that the same displacement of the link 22 will determine different angles of rotation of the wheel 13 as required.

On the other hand, by manipulating the regulating screw 17, it is possible to vary the position of the bell-crank lever 16, thereby varying the position of the pivotal pin 19 of the lever 20, and the distance from this pivotal pin 19 to the point of contact of the lever 20 with the end of the plunger 7, which constitutes the fulcrum of this lever. Hence by regulating the screw 17 it is possible to vary the ratio between the arms of the lever 20, and hence to vary the stroke of the link 22 for a given stroke of the plunger 7. The combination of these two adjustable elements enables this apparatus to be adapted to practically any class of internal combustion engine, so that the position of the needle or pointer 3 may correspond at any moment to the load on the engine.

With the apparatus which is the subject of this invention, the operator who is in charge of an internal combustion engine, merely by observing the position of the needle or pointer 3 on the dial, knows whether the working of the engine is normal or not. This apparatus can also be used in a multi-cylinder engine in order to determine quickly whether any one of the cylinders of the engine is working deficiently. For this test the engine is put at a speed lower than full-load speed, and the supply of fuel to one of the cylinders is stopped. If this cylinder was working well, on the suppression of the supply of fuel thereto the other cylinders will have to do more work, so the governor will increase the injection of fuel, and the needle 3 will move over the dial, indicating this increased movement of the governor. If on the other hand the cylinder that has been deprived of fuel was not functioning, the load which the other cylinders already had would not increase on suppression of its feed, and consequently the governor would not rise or fall, or would move but slightly, and similarly the needle 3 would not move or would move only slightly on the dial, thus indicating that the cylinder that has been cut out had been functioning defectively.

The indications of this apparatus can be transmitted to one or more auxiliary dials remote from the apparatus by means of a flexible shaft or by means of electrical or hydraulic transmission means.

I claim:

1. Power-indicating apparatus for internal combustion engines having rectilinearly movable means actuated by a governor to control the amount of fuel supplied to the engine, comprising a casing with a dial, a needle coacting with said dial, a plunger centrally entering said casing, said plunger being axially slidably mounted in said casing and substantially parallel to said rectilinearly movable means, means supporting said plunger, said supporting means connecting said plunger to said rectilinearly movable means for direct corresponding movement therewith, so that the position of the plunger is at any moment directly related to the amount of fuel supplied to the engine, a toothed gearing connected to said needle, and a rod-and-lever mechanism for transmitting movement from said plunger to said gearing in order to move said needle in an amplified relation with the movements of the fuel supply means.

2. Power-indicating apparatus as claimed in claim 1, and wherein the connection between the plunger and the needle comprises a lever actuated by the plunger, a link pivotally connected at one end to said lever, a toothed wheel, said link being articulated to a point on said toothed wheel, and a pinion fixed to the shaft of the needle meshing with said toothed wheel whereby small oscillations of said lever produced by said plunger are amplified in being transmitted to the needle.

3. Power-indicating apparatus as claimed in claim 2, and wherein the fulcrum of the lever is adjustable in position, whereby the amplification of movement produced by this lever is variable in order to adapt the apparatus to different engines.

4. Power-indicating apparatus as claimed in claim 3, and wherein said link which moves said toothed wheel can be connected to different points of said wheel, to vary the zero position of the needle and the amplification of movement, so as to adapt the apparatus to different engines.

ALBERTO LAGARDÈRE.

References Cited in the file of this patent

UNITED STATES PATENTS

| Number | Name | Date |
|---|---|---|
| 1,395,638 | Grubman et al. | Nov. 1, 1921 |
| 1,411,412 | Converse | Apr. 4, 1922 |

FOREIGN PATENTS

| Number | Country | Date |
|---|---|---|
| 163,590 | Switzerland | Nov. 16, 1933 |